US000001455H

United States Statutory Invention Registration [19]

[11] Reg. Number: H1455

Brow et al.

[43] Published: Jul. 4, 1995

[54] TITANIUM HERMETIC SEALS

[75] Inventors: Richard K. Brow, Albuquerque; Randall D. Watkins, Tijeras, both of N. Mex.

[73] Assignee: The United States of America as represented by the United States Department of Energy, Washington, D.C.

[21] Appl. No.: 215,432

[22] Filed: Mar. 21, 1994

[51] Int. Cl.[6] ..... C03C 27/02

[52] U.S. Cl. ..... 65/59.1; 65/59.5; 65/32.1; 65/32.2

[58] Field of Search ..... 65/59.1, 59.5, 32.1, 65/32.2

[56] References Cited

U.S. PATENT DOCUMENTS 5,104,738 4/1992 Brow et al. ..... 428/433
5,294,241 3/1994 Taylor et al. ..... 65/59.1

OTHER PUBLICATIONS

"Kimble Glass Technical Data Sheet" (undated).

H. Rawson, et al., "The Glass Sealing Properties of Titanium and Zirconium", *British Journal Applied Physics*, vol. 5, Oct. 1954, pp. 352–353.

W. H. Kohl, *Handbook of Materials and Techniques for Vacuum Devices*, Reinhold Publishing Corp., N.Y., N.Y., 1967, pp. 401, and 415–416.

A. Passerone, et al., "The Titanium–Molten Glass System: Interactions and Wetting", *Journal of Material Science 12*, 1977, pp. 2465–2474.

Z. Feipeng, et al., "Wetting and Reactions in Glass-/Titanium Systems", Proc. 33rd Pacific Coast ACS Meeting, 1980, pp. 76–78.

R. K. Brow, et al., "Reactions and Bonding Between Glasses and Titanium", Proc. Winter Meeting ASME MD–4, 1987, pp. 25–30.

*Primary Examiner*—Donald P. Walsh
*Assistant Examiner*—Anthony R. Chi
*Attorney, Agent, or Firm*—Russell D. Elliott; James H. Chafin; William R. Moser

[57] ABSTRACT

Titanium is prenitrided by being heated in a nitrogen environment under conditions which give rise to the formation of a titanium-nitride surface layer on the titanium. Titanium thus prenitrided may be used in electrical components which are hermetically sealed using silicate glasses and standard glass sealing techniques. According to the method of the invention, alkali volatilization and formation of deleterious interfacial silicide are inhibited.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TITANIUM HERMETIC SEALS

GOVERNMENT RIGHTS

The U.S. Government has rights in this invention pursuant to Contract No. DE-AC04-76DP00789 between the U.S. Department of Energy (DOE) and AT&T Technologies, Inc. (Sandia).

BACKGROUND OF THE INVENTION

1. Field of Invention

This invention relates generally to improved glass-to-titanium seals and, more particularly, to prenitriding titanium so as to avoid deleterious interfacial reactions that occur between standard sealing glasses and titanium Such interfacial reactions often prevent strong hermetic glass-to-titanium seals. Disclosed is a method for prenitriding titanium and making improved silicate glass-to-titanium seals appropriate for use in electronic components.

2. Description of the Related Art

In a field of electronic components design and utilization, titanium is a very useful material because it has outstanding strength-to-weight ratio, extremely good chemical durability in corrosive environments and moderately high temperature stability. Prior to the present invention, however, because no reliable glass-to-titanium sealing technology existed, titanium could not be used in devices that required truly durable and hermetic sealing. Commercial silicate glasses are typically recommended for sealing to titanium both because they have favorable physical and chemical properties and because they are readily available and relatively inexpensive. (See H. Rawson, et al., "The Glass Sealing Properties of Titanium and Zirconium", Br. J. Appl. Phys., 5 352 (1954), W. H. Kohl, *Handbook of Materials and Techniques for Vacuum Devices,* p. 401, Reinhold Publishing Corp, N.Y. (1967).) At sealing temperatures (above 900° C.), however, silicate glasses rapidly react with the titanium metal to create bubbles due to alkali volatilization. Also an interfacial silicide phase forms which is deleterious to the hermeticity and strength of the glass-to-metal seal. For example, pin seals between silicate glasses and titanium have been shown to be only about half as strong as standard seals used in electronic components. It is believed that the lack of strength and hermeticity is due to poor adherence between the glass and the silicide. (A. Passerone, et al., "The Titanium-Molten Glass System: Interactions and Wetting", J. Mat. Sci., 12, 2465 (1977), Z. Feipeng, et al., "Wetting and Reactions in Glass/Titanium Systems", Proceedings of the 33rd Pacific Coast Regional Meeting of the American Ceramic Society, San Francisco, Calif., 76 (1980), R. K. Brow and R. D. Watkins, "Reactions and Bonding Between Glasses and Titanium", Proc. Winter Meeting ASME, MD-4, 25 (1987)).

Efforts to improve glass-to-titanium seals have primarily involved either altering sealing conditions for silicate glass or using different glass compositions which are less susceptible than silicate glass to forming interfacial. Layers in reaction with titanium. Early studies showed, for example, that shortened sealing times could help alleviate problems with differentials in thermal coefficients of expansion between the silicate glass and the titanium, while tending to decrease the rates of reaction at the interface between the glass and metal. (Rawson, et al.) The interfacial reactions, however, proved to be rapid, indeed, and high quality hermetic seals between titanium and silicate glasses still could not be obtained.

More recently, boroaluminate glasses have been demonstrated to form hermetically good seals in titanium components. (R. K. Brow and R. D. Watkins, "Sealing Glasses for Titanium and Titanium Alloys", U.S. Pat. No. 5,104,738, issued 1992). Although at sealing temperatures titanium still reacts initially with the boroaluminate glasses to form a thin interfacial boride layer, the reaction quickly subsides apparently because the interfacial boride passivates the titanium to prevent the types of uncontrolled deleterious reactions that prohibit formation of adequate seals between titanium and silicate glasses. While the mechanical characteristics of these seals are quite good, the boroaluminate glasses which are useful in a number of applications unfortunately cannot withstand many of the corrosive environments for which titanium components are needed.

There is an ongoing need for titanium components with hermetic glass-to-metal seals in a wide variety of government and commercial applications ranging from pyrotechnics and explosives to biomedical implant devices. In such applications, the high corrosion resistance of titanium can be extremely valuable, especially where chemically durable and widely available silicate glasses are used to seal components.

BRIEF SUMMARY OF THE INVENTION

In view of the above-described needs, it is an object of the present invention to provide a method for enhancing the hermeticity of silicate glass-to titanium seals.

It is another object of the present invention to provide a method wherein the titanium surface adjoining sealing glass is passivated in order to inhibit or prevent formation of interfacial silicide between the glass and titanium.

It is yet another object of the present invention to provide a method for prenitriding titanium by heating it in a nitrogen-rich environment under conditions which give rise to a titanium-nitride surface layer on the titanium.

It is yet another object of the present invention to provide a method for creating durable hermetically sealed titanium components which comprise prenitrided titanium and silicate glass.

Upon further study of the specification and appended claims, further objects and advantages will become apparent to those skilled in the art.

These objects have been obtained by providing the method and apparatuses of the present invention.

DETAILED DESCRIPTION OF THE INVENTION

The invention concerns passivation of titanium surfaces prior to silicate glass sealing to prevent silicide formation. Silicate glass seals to both preoxidized and prenitrided titanium were studied to see what effects titanium oxide and titanium nitride surface layers have on seal chemistry and properties. The preoxidized titanium-silicate glass seals using titanium pins that were exposed to oxygen-containing atmospheres for 2 to 60 minutes at 1000° C. were similar to previous silicate glass seals in that there was extensive interfacial silicide formation and the seals were mechanically very weak. On the other hand, the prenitrided seals were very strong with good adhesion of the glass to the metal, and there was no evidence of interfacial silicide formation. With the exception of the preoxidation or prenitridation step, standard glass-to-metal sealing techniques, known to those skilled in the art, were used to make the test specimens.

Prenitridization is done on titanium components cleaned using the standard four-step procedure known to those skilled in the art of creating glass-to-metal seals. According to the preferred embodiment, cleaned titanium components are placed in a fumace that is evacuated and then back-filled with gettered nitrogen. It is important to reduce the partial pressure of oxygen exposed to the titanium to as low a value as possible in order to prevent titanium oxides from forming on the titanium components. (As noted above, titanium oxide surface layers do not passivate titanium sufficiently to prevent deleterious glass reactions.) Accordingly, it is favorable to use graphite furnace fixtures instead of quartz furnace fixtures since the graphite will serve to getter residual oxygen from the furnace environment. We have made seals using titanium pins that were prenitrided at 1000° C. from 2 to 60 minutes. Where graphite fixtures were used, the seals were reliably strong. It may be possible to make good nitride surface films under other conditions if the partial pressure of oxygen is sufficiently low in the reaction environment.

The titanium nitride surface film appears to dissolve much more slowly into the glass than a titanium oxide surface film. For example, electron microprobe examinations of the interfaces of these two types of seals show much higher titanium concentrations in the silicate glass sealed to the preoxidized titanium. This is a sign of much more extensive interfacial reactions in the case of the titanium oxide surface film. We have detected signs of nitrogen dissolved in the interfaces of seals made to prenitrided titanium. Apparently, an oxynitride glass forms in this region which appears to be chemically and mechanically compatible with the remaining titanium-nitride surface layer. This, in turn, strongly adheres to the titanium. Since the surface nitride dissolves so slowly, it acts as a passivation layer for the titanium, allowing enough time for good seals to be made using standard silicate glass sealing techniques.

The foregoing description of the invention has been presented for purposes of illustration. It is not intended to be exhaustive or to limit the invention to the precise forms disclosed. Obvious modifications or variations are possible in light of the above teachings. The description enables one of ordinary skill in the art to best utilize the invention in various embodiments and with various modifications as are suited to the particular use contemplated, as long as the principles described herein are followed. Thus, changes can be made in the above-described invention without departing from the spirit and scope thereof. It is also intended that the scope of the invention be defined by the claims appended hereto. The invention is intended to encompass all such variations as fall within its spirit and scope.

We claim:

1. A method for enhancing seals between silicate glass and titanium including the step of passivating titanium surfaces using nitrogen prior to sealing.

2. The method of claim 1 wherein said passivation step includes heating said titanium in the presence of nitrogen.

3. The method of claim 2 wherein said heating takes place at 1000° C.

4. The method of claim 2 wherein said heating occurs for between 2 and 60 minutes.

5. The method of claim 3 wherein said heating occurs for between 2 and 60 minutes.

6. The method of claim 2 wherein said heating occurs in a furnace that is evacuated and then back-filled with gettered nitrogen.

7. The method of claim 3 wherein said heating occurs in a furnace that is evacuated and then back-filled with gettered nitrogen.

8. The method of claim 4 wherein said heating occurs in a furnace that is evacuated and then back-filled with gettered nitrogen.

9. The method of claim 5 wherein said heating occurs in a furnace that is evacuated and then back-filled with gettered nitrogen.

10. The method of claim 6 wherein said furnace contains graphite fixtures.

11. The method of claim 7 wherein said furnace contains graphite fixtures.

12. The method of claim 8 wherein said furnace contains graphite fixtures.

13. The method of claim 9 wherein said furnace contains graphite fixtures.

* * * * *